United States Patent
Palanisamy et al.

(10) Patent No.: US 9,658,713 B2
(45) Date of Patent: May 23, 2017

(54) SYSTEMS, METHODS, AND APPLICATIONS FOR DYNAMIC INPUT MODE SELECTION BASED ON WHETHER AN IDENTIFIED OPERATING SYSTEM INCLUDES AN APPLICATION PROGRAM INTERFACE ASSOCIATED WITH THE INPUT MODE

(71) Applicant: Intel Corporation, Santa Clara, CA (US)

(72) Inventors: Kandasubramaniam K. Palanisamy, Hillsboro, OR (US); James W. Edwards, Hillsboro, OR (US); Thomas J. Pett, Portland, OR (US); Daria A. Loi, Portland, OR (US); Jered H. Wikander, Portland, OR (US); David W. Browning, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/492,205

(22) Filed: Sep. 22, 2014

(65) Prior Publication Data

US 2016/0085358 A1 Mar. 24, 2016

(51) Int. Cl.
*G06F 3/041* (2006.01)
*G06F 3/0482* (2013.01)
(Continued)

(52) U.S. Cl.
CPC .......... *G06F 3/0416* (2013.01); *G06F 3/0482* (2013.01); *G06F 3/04842* (2013.01);
(Continued)

(58) Field of Classification Search
CPC .. G06F 3/0416; G06F 3/0482; G06F 3/04842; G06F 2203/04101; G06F 3/04883; G06F 2203/04805; G09G 3/2096
See application file for complete search history.

(56) References Cited

U.S. PATENT DOCUMENTS

| 2004/0025156 | A1* | 2/2004 | Rochford, II | G06F 9/4411 717/174 |
| 2008/0303834 | A1* | 12/2008 | Swift | G06T 1/20 345/522 |

(Continued)

*Primary Examiner* — Ryan A Lubit
(74) *Attorney, Agent, or Firm* — Grossman, Tucker, Perreault & Pfleger, PLLC

(57) ABSTRACT

The present application is directed to dynamic input mode selection. In general, a system may sense a user's finger approaching a surface of a display (e.g., an imminent user touch input) and, depending on at least one trigger condition, may perform at least one output operation. For example, a first trigger condition may cause a display to enlarge at least a portion of a displayed image based on the imminent user touch input, a second trigger condition may cause the display to present a menu corresponding to an object in the enlarged portion, etc. This functionality may be implemented utilizing either an operating system (OS)-aware configuration or an OS-unaware configuration. In an OS-aware configuration, an intent-to-touch (ITT) module may utilize application program interfaces (APIs) in the OS to facilitate display zooming, menu presentation, coordinate translation, etc. In an OS-unaware configuration, the ITT module may facilitate these actions without OS assistance.

19 Claims, 5 Drawing Sheets

(51) Int. Cl.
*G06F 3/0484* (2013.01)
*G06F 3/0488* (2013.01)
*G09G 3/20* (2006.01)

(52) U.S. Cl.
CPC ....... *G06F 3/04883* (2013.01); *G09G 3/2096* (2013.01); *G06F 2203/04101* (2013.01); *G06F 2203/04805* (2013.01)

(56) References Cited

U.S. PATENT DOCUMENTS

| | | | |
|---|---|---|---|
| 2010/0085316 A1* | 4/2010 | Kim | G06F 1/1616 345/173 |
| 2015/0067570 A1* | 3/2015 | Yoon | G06F 3/04886 715/773 |
| 2015/0169101 A1* | 6/2015 | Jung | G06F 3/044 345/174 |
| 2015/0253925 A1* | 9/2015 | Nakao | G06F 3/04883 345/173 |

\* cited by examiner

SYSTEMS, METHODS, AND APPLICATIONS FOR DYNAMIC INPUT MODE SELECTION BASED ON WHETHER AN IDENTIFIED OPERATING SYSTEM INCLUDES AN APPLICATION PROGRAM INTERFACE ASSOCIATED WITH THE INPUT MODE

TECHNICAL FIELD

The present disclosure relates to user interaction with a device, and more particularly, to a system able to sense an imminent user touch input and to support the imminent user touch input.

BACKGROUND

The evolution of modern computing technology has focused on producing devices having more "horsepower" than the previous generation. These technological advances have comprised, for example, the development of processors including more and/or faster processing cores able to process larger amounts of data in a shorter amount of time when compared to previous solutions, bus and/or memory architectures that are capable of keeping up with more advanced processors, wired and/or wireless communication protocols having higher bandwidth along with protective measures to allow for the delivery of vast amounts of data in a secure manner, etc. While all of these advances may constitute substantial improvements, they still only contribute to the overall user quality of experience. For example, the capability of quickly processing a large amount of data may be rendered virtually meaningless if the data cannot be readily accessed, manipulated, etc. by the user. Thus, the user interface-related aspects of the device must also be developed.

At least for consumer electronics, user interface technology had been limited to physical peripherals such as a mouse and/or keyboard for many years. The focus on touch interfaces for mobile devices (e.g., smart phones) helped to generate interest for similar touch interfaces being available for desktop, laptop and eventually tablet computers. Touch interfaces may allow a user to directly interact with a device by touching a location on a display of the device. At least one benefit that may be readily apparent is that the user is able to directly interact within a displayed object to be manipulated. This manner of direct interaction is intuitive, and may be preferred in devices configured for touch operation (e.g., having user interfaces constructed specifically for use with touch interaction). While the benefits of touch control are apparent, there can be some drawbacks in situations not specifically designed for touch control. For example, some desktop computers are becoming available that are equipped for standard user interfaces (e.g., keyboard and/or mouse) with the added benefit of displays allowing for touch control. The visual interface presented on the display may still be configured based for mouse and keyboard, and thus, do not readily allow for touch, despite the capability being available. For example, touch control may not be as refined as keyboard/mouse control, may provide for only the selection of an object, etc.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
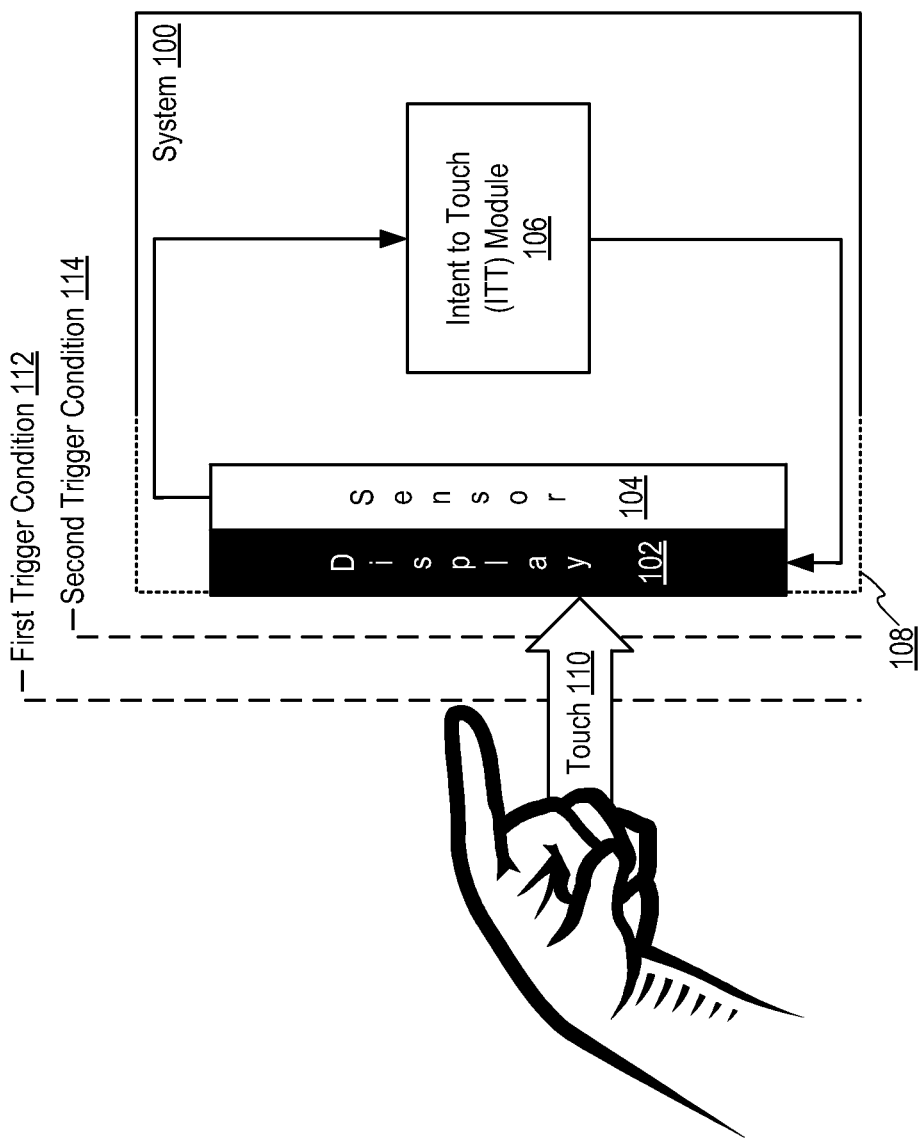
FIG. 1 illustrates an example system configured for dynamic input mode selection in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

The present application is directed to dynamic input mode selection. In general, a system may sense a user's finger approaching a surface of a display (e.g., an imminent user touch input) and, depending on at least one trigger condition, may perform at least one output operation. This functionality may be implemented using either an operating system (OS)-aware configuration or an OS-unaware configuration. In an example of operation, at least one sensor in the device may sense at least distance between the imminent user touch input and the surface. When the sensed distance is determined to satisfy a first condition, the at least one sensor may send touch data to an intent-to-touch (ITT) module. In an OS-aware configuration, the ITT module may then, for example, interact with an application program interface (API) to cause the display to present an enlarged version of at least a portion of an image based on the touch data. In an OS-unaware configuration, the ITT module may determine coordinates for the imminent user touch input and may provide those coordinates to a graphics driver that is configured to control zooming based on the coordinates. When the imminent user touch input is determined to satisfy a second trigger condition, the ITT module may cause a menu to be presented on the display corresponding to at least one object within the enlarged version of the portion of the image based on API interaction (e.g., in an OS-aware configuration) or the ITT module generating the menu and providing it to the graphics driver (e.g., in an OS-unaware configuration). When a user touch occurs within the enlarged version of at least a portion of the image, the translation of the touch coordinates in the enlarged version to coordinates in the normal image will be handled either internally by the OS or by the ITT module based on the particular implementation of dynamic input mode selection.

In at least one embodiment, a system configured for dynamic input mode selection may comprise, for example, a display, at least one sensor and an ITT module. The display may be to present at least one image. The at least one sensor may be to sense an imminent user touch input to the display. The ITT module may be to determine a system configuration and to implement ITT interaction in the system based at least on the system configuration, the ITT interaction including the system being configured to generate touch data when the at least one sensor senses an imminent user touch input and to cause the display to perform at least one output operation when the imminent user touch input satisfies at least one trigger condition.

The ITT module being to determine a system configuration may comprise, for example, the ITT module being to determine characteristics of an operating system in the system. The ITT module being to determine characteristics of the operating system may comprise the ITT module being to determine if at least one API in the operating system will allow the ITT module to interact with at least the display. For example, the system being to cause the display to perform at least one output operation may comprise the ITT module being to interact with an API for magnification in the operating system that then causes the display to further present an enlarged version of at least a portion of the image based on coordinates in the touch data when the first trigger condition is determined to have been satisfied. The system being to cause the display to perform at least one output operation may comprise the ITT module being to interact with an API for menu generation to cause the display to further present at least a menu associated with at least one object in the enlarged version of the at least a portion of the image when the second trigger condition is determined to have been satisfied. The operating system may further be to translate a user touch input executed within the enlarged version of at least a portion of the image into a user touch input executed within the image.

In the same or a different embodiment, the system being to cause the display to perform at least one output operation may also comprise the ITT module being to transmit coordinates in the touch data to a graphics driver that then causes the display to further present an enlarged version of at least a portion of the image based on the coordinates when the first trigger condition is determined to have been satisfied. The system being to cause the display to perform at least one output operation may comprise the ITT module being to generate a menu associated with at least one object in the enlarged version of the at least a portion of the image and to provide the menu to the graphics driver that then causes the display to further present at least the menu when the second trigger condition is determined to have been satisfied. The ITT module may further be to cause a touch controller for controlling the at least one sensor to translate coordinates associated with a user touch input in the enlarged version of the at least a portion of the image to coordinates for the user touch input in the image and to receive the coordinates for the user touch input in the image from the touch controller. An example method for dynamic input mode selection consistent with the present disclosure may comprise determining a system configuration and implementing ITT interaction in the system based at least on the system configuration, the ITT interaction including generating touch data when at least one sensor in the system senses an imminent user touch input to a display in the system and causing the display to perform at least one output operation when the imminent user touch input satisfies at least one trigger condition.

FIG. 1 illustrates an example system configured for dynamic input mode selection in accordance with at least one embodiment of the present disclosure. In general, FIG. 1 discloses an example of user interaction with system 100. System 100 may comprise at least display 102, at least one sensor 104 and ITT module 106. Dotted line 108 indicates that display 102 and/or sensor 104 do not need to reside in the same device as ITT module 106. For example, display 102 and/or sensor 104 may be situated in one device (e.g., a standalone monitor, television, etc.) that is wired and/or wirelessly coupled to another device (e.g., a desktop CPU, a gaming system, etc.) that includes ITT module 106. Alternatively, display 102, sensor 104 and ITT module 106 may all reside in the same device. Various examples of system 100 may comprise, but are not limited to, a mobile communication device such as a cellular handset, smart phone, etc. based on the Android® operating system (OS) from the Google Corporation, iOS® from the Apple Corporation, Windows® OS from the Microsoft Corporation, Mac OS from the Apple Corporation, Tizen™ OS from the Linux Foundation, Firefox® OS from the Mozilla Project, Blackberry® OS from the Blackberry Corporation, Palm® OS from the Hewlett-Packard Corporation, Symbian® OS from the Symbian Foundation, etc., a mobile computing device such as a tablet computer like an iPad® from the Apple Corporation, Surface® from the Microsoft Corporation, Galaxy Tab® from the Samsung Corporation, Kindle Fire® from the Amazon Corporation, etc., an Ultrabook® including a low-power chipset manufactured by Intel Corporation, a netbook, a notebook, a laptop, a palmtop, etc., a wearable device such as wristwatch form factor computing devices like the Galaxy Gear® from Samsung, eyewear form factor interfaces like Google Glass® from the Google Corporation, etc., a typically stationary computing device such as a desktop computer with or without an integrated monitor, a server, a smart television, small form factor computing solutions (e.g., for space-limited computing applications, TV set-top boxes, etc.) like the Next Unit of Computing (NUC) platform from the Intel Corporation, etc.

In one embodiment, display 102 may be based on various display technologies such as, but not limited to, cathode ray tube (CRT), liquid crystal display (LCD), plasma, light emitting diode (LED), active-matrix organic LED (AMOLED), Retina® from the Apple Corporation, etc. Display 102 may be configured to present at least one image to a user of system 100. An image may include a typical graphical desktop comprising applications, windows, icons, widgets, etc. Sensor 104 may function as a standalone component used in conjunction with display 102, or alternatively, some or all of sensor 104 may be integrated within display 102. Sensor 104 may be situated in-front of display 102, within display 102, behind display 102, etc., and may employ various sensing technologies to detect when imminent user touch input 110 such as, but not limited to, visual (e.g., camera based, photoelectric, etc.) proximity sensing, electromagnetic (e.g., hall effect) proximity sensing, electronic (e.g., capacitive) proximity sensing, infrared (IR) proximity sensing, etc. Regardless of the particular technology, sensor 104 may be capable of sensing at least one of location (e.g., coordinates) on a surface of display 102 corresponding to imminent user touch input 110 or a distance of the imminent user touch input 110 (e.g., based on the tip of a user's finger) from the surface. In at least one embodiment, sensor 104 and/or ITT module 106 may further be able to determine the time during which imminent user touch input 110 is at a certain distance, a cross-sectional area for imminent user touch input 110, etc.

In an example of operation, sensor 104 may sense various parameters corresponding to imminent user touch input 110, and may provide these parameters to ITT module 106 as touch data. ITT module 106 may then determine, based on the touch data, if imminent user touch input 110 satisfies a trigger condition. First trigger condition 112 and second trigger condition 114 are illustrated for the sake of example in FIG. 1, however, embodiments consistent with the present disclosure are not limited to any particular number of trigger conditions. First trigger condition 112 may correspond to imminent user touch input 110 being a first distance from the surface of display 102, while second trigger condition 114 may correspond to imminent user touch input 110 being a second distance from the surface of display 102, the second distance being smaller than the first distance. There may also be a temporal component to trigger conditions 112 and 114 in that imminent user touch input 110 may need to be at the first or second distance for at least a certain amount of time. In one embodiment, ITT module 106 may cause display 102 to perform various output operations based on imminent user touch input 110 satisfying at least one of first trigger condition 112 or second trigger condition 114. Output operations may comprise, for example, changes to how the image is presented on display 102, the provision of additional user interface features to enhance the user experience, etc. Examples of output operations will be disclosed further in regard to FIG. 3. In one embodiment, ITT module 106 may also utilize touch data for determining whether an object sensed as proximate to the surface of display 102 is actually an imminent user touch input 110. For example, sensor 104 may provide cross-sectional data to ITT module 106 for use in determining if a sensed object is imminent user touch input 110 (e.g., a finger) or another object masquerading as imminent user touch input 110 such as, for example, the user closing the lid of a laptop, a carrying case for system 100, a pet, an insect, etc.

Figure 2:
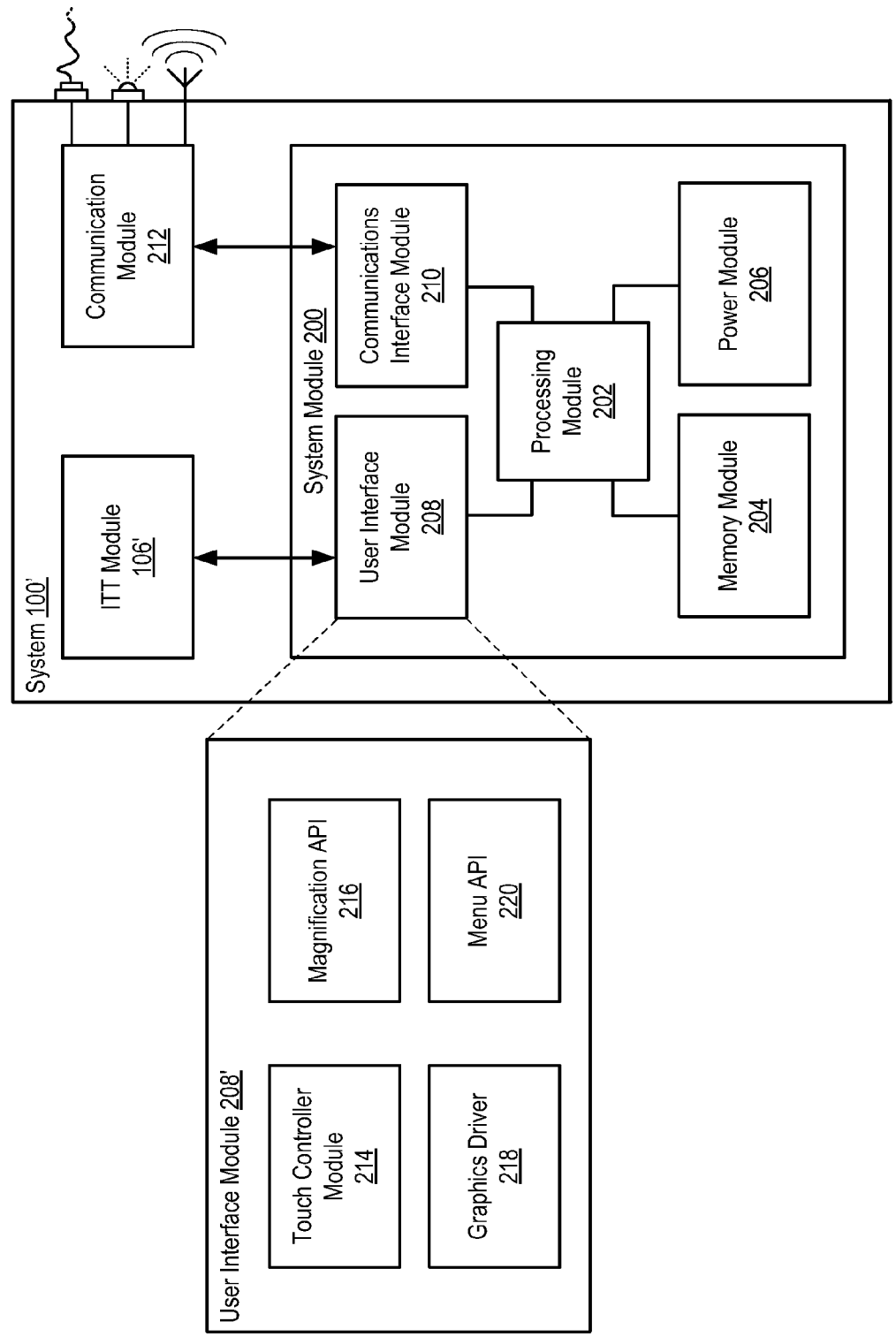
FIG. 2 illustrates an example configuration for a device usable in accordance with at least one embodiment of the present disclosure.

FIG. 2 illustrates an example configuration for a device usable in accordance with at least one embodiment of the present disclosure. In particular, example system 100' may be capable of performing any of the activities disclosed in FIG. 1. However, system 100' is meant only as an example of an apparatus usable in embodiments consistent with the present disclosure, and is not meant to limit these various embodiments to any particular manner of implementation. It is also important to note that while example system 100' has been illustrated in FIG. 2 as a single device, it is also possible for some elements (e.g., display 102, sensor 104, etc.) to be separately situated.

System 100' may comprise, for example, at least system module 200 to manage system operations. System module 200 may include, for example, processing module 202, memory module 204, power module 206, user interface module 208 and communication interface module 210. System 100' may further include communication module 212 and ITT module 106'. While communication module 212 and ITT module 106' have been illustrated as separate from system module 200, the example implementation shown in FIG. 2 has been provided merely for the sake of explanation. Some or all of the functionality associated with communication module 210 and ITT module 106' may also be incorporated into system module 200.

In system 100', processing module 202 may comprise one or more processors situated in separate components, or alternatively, one or more processing cores embodied in a single component (e.g., in a System-on-a-Chip (SoC) configuration) and any processor-related support circuitry (e.g., bridging interfaces, etc.). Example processors may include, but are not limited to, various x86-based microprocessors available from the Intel Corporation including those in the Pentium, Xeon, Itanium, Celeron, Atom, Core i-series product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) configured to provide an interface through which processing module 202 may interact with other system components that may be operating at different speeds, on different buses, etc. in system 100'. Some or all of the functionality commonly associated with the support circuitry may also be included in the same physical package as the processor (e.g., such as in the Sandy Bridge family of processors available from the Intel Corporation).

Processing module 202 may be configured to execute various instructions in system 100'. Instructions may include program code configured to cause processing module 202 to perform activities related to reading data, writing data, processing data, formulating data, converting data, transforming data, etc. Information (e.g., instructions, data, etc.) may be stored in memory module 204. Memory module 204 may comprise random access memory (RAM) and/or read-only memory (ROM) in a fixed or removable format. RAM may include volatile memory configured to hold information during the operation of system 100' such as, for example, static RAM (SRAM) or Dynamic RAM (DRAM). ROM may include non-volatile (NV) memory modules configured based on BIOS, UEFI, etc. to provide instructions when system 100' is activated, programmable memories such as electronic programmable ROMs (EPROMS), Flash, etc. Other fixed/removable memory may include, but are not limited to, magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), Digital Video Disks (DVD), Blu-Ray Disks, etc.

Power module 206 may include internal power sources (e.g., a battery, fuel cell, etc.) and/or external power sources (e.g., electromechanical or solar generator, power grid, fuel cell, etc.), and related circuitry configured to supply system 100' with the power needed to operate. User interface module 208 may include hardware and/or software to allow users to interact with system 100' such as, for example, various input mechanisms (e.g., microphones, switches, buttons, knobs, keyboards, speakers, touch-sensitive surfaces, one or more sensors configured to capture images and/or sense proximity, distance, motion, gestures, orientation, etc.) and various output mechanisms (e.g., speakers, displays, lighted/flashing indicators, electromechanical components for vibration, motion, etc.). In at least one embodiment, user interface module 208 may comprise at least one of display 102 or sensor 104. The hardware in user interface module 208 may be incorporated within system 100' and/or may be coupled to system 100' via a wired or wireless communication medium.

Communication interface module 210 may be configured to manage packet routing and other control functions for communication module 212, which may include resources configured to support wired and/or wireless communications. In some instances, system 100' may comprise more than one communication module 212 (e.g., including separate physical interface modules for wired protocols and/or wireless radios) all managed by a centralized communication interface module 210. Wired communications may include serial and parallel wired mediums such as, for example, Ethernet, USB, Firewire, Digital Video Interface (DVI), High-Definition Multimedia Interface (HDMI), etc. Wireless communications may include, for example, close-proximity wireless mediums (e.g., radio frequency (RF) such as based on the Near Field Communications (NFC) standard, infrared (IR), etc.), short-range wireless mediums (e.g., Bluetooth, WLAN, Wi-Fi, etc.), long range wireless mediums (e.g., cellular wide-area radio communication technology, satellite-based communications, etc.) or electronic communications via sound waves. In one embodiment, communication interface module 210 may be configured to prevent wireless communications that are active in communication module 212 from interfering with each other. In performing this function, communication interface module 210 may schedule activities for communication module 212 based on, for example, the relative priority of messages awaiting transmission. While the embodiment disclosed in FIG. 2 illustrates communication interface module 210 being separate from communication module 212, it may also be possible for the functionality of communication interface module 210 and communication module 212 to be incorporated into the same module.

Consistent with the present disclosure, ITT module 106' may interact with at least user interface module 208. For example, ITT module 106' may receive touch data from sensor 104 in user interface module 208, and based on the touch data, may cause display 102 in user interface module 208 to perform various output operations. In at least one embodiment, the particular manner in which ITT module 106' operates may be predicated on whether the implementation of ITT functionality in system 100' is OS-aware (e.g., utilizes resources available in the OS) or OS-unaware (e.g., performs ITT functionality without reliance upon OS interactivity). Whether an implementation of ITT functionality is OS-aware or OS-unaware depends on the configuration of system 100'. For example, an OS-aware implementation would require system 100' to comprise an OS (e.g., Microsoft Windows, iOS, Android, etc.) including at least one API accessible to ITT module 106' for receiving data from or transmitting commands to display 102 and/or sensor 104.

In an example OS-aware implementation, user interface module 208' may comprise, for example, touch controller module 214, magnification API 216, graphics driver 218 and menu API 220. Touch controller module 214 may be configured to control sensor 104 and may detect imminent user touch input 110. Touch controller module 214 may generate touch data (e.g., including coordinates corresponding to imminent user touch input 110) for use by ITT module 106'. ITT module 106' may then evaluate the touch data to determine if at least one of the first trigger condition or the second trigger condition has been satisfied. Based on this evaluation, ITT module 106' may then utilize magnification API 216 to cause graphics drivers 218 to zoom into (e.g., present an enlarged version) of a portion of an image presented on display 102, may utilize menu API 220 to cause additional controls to be presented on display 102 such as an object-specific user interface feature (e.g., menu), etc. It is important to note that magnification API 216 and menu API 220 are merely examples of APIs that may exist in an OS, and that the actual disposition of the APIs may change depending on the OS. For example, the functionality associated with APIs 216 and 220 may actually be handled by one API, more than two APIs, etc.

In an OS-unaware implementation, ITT module 106' may disregard OS-based resources and interact using a specialized application, directly with graphics driver 218, etc. For example, ITT module 106' may interact directly with an API of graphics driver 218 to cause at least a portion of an image presented on display 102 to zoom-in (e.g., become enlarged) in an area that surrounds coordinates provided in the touch data. If it is then determined that the second trigger condition has been satisfied, ITT module 106' may determine an object that is most probably the focus of imminent user touch input 110, and may generate a menu (e.g., or at least collect data for generating a menu) based on the object for presentation on display 110. ITT module 106' may then provide the menu (e.g., or data for menu generation) to the API of graphics driver 218. Graphics driver 218 may then present the menu. ITT module 106' may then transmit a message causing touch controller 218 to change modes to translate the coordinates in the zoomed-in area to coordinates for the original display. When a user actually touches the surface of display 102, touch controller 214 may then transmit a message including the corresponding coordinates of the touch for use in executing activity based on the touch (e.g., moving an object corresponding to the touch, selecting a menu item based on the touch, etc.). ITT module 106' may then restore display 102 to the original zoomed-out image and disable translation in touch controller 214.

Figure 3:
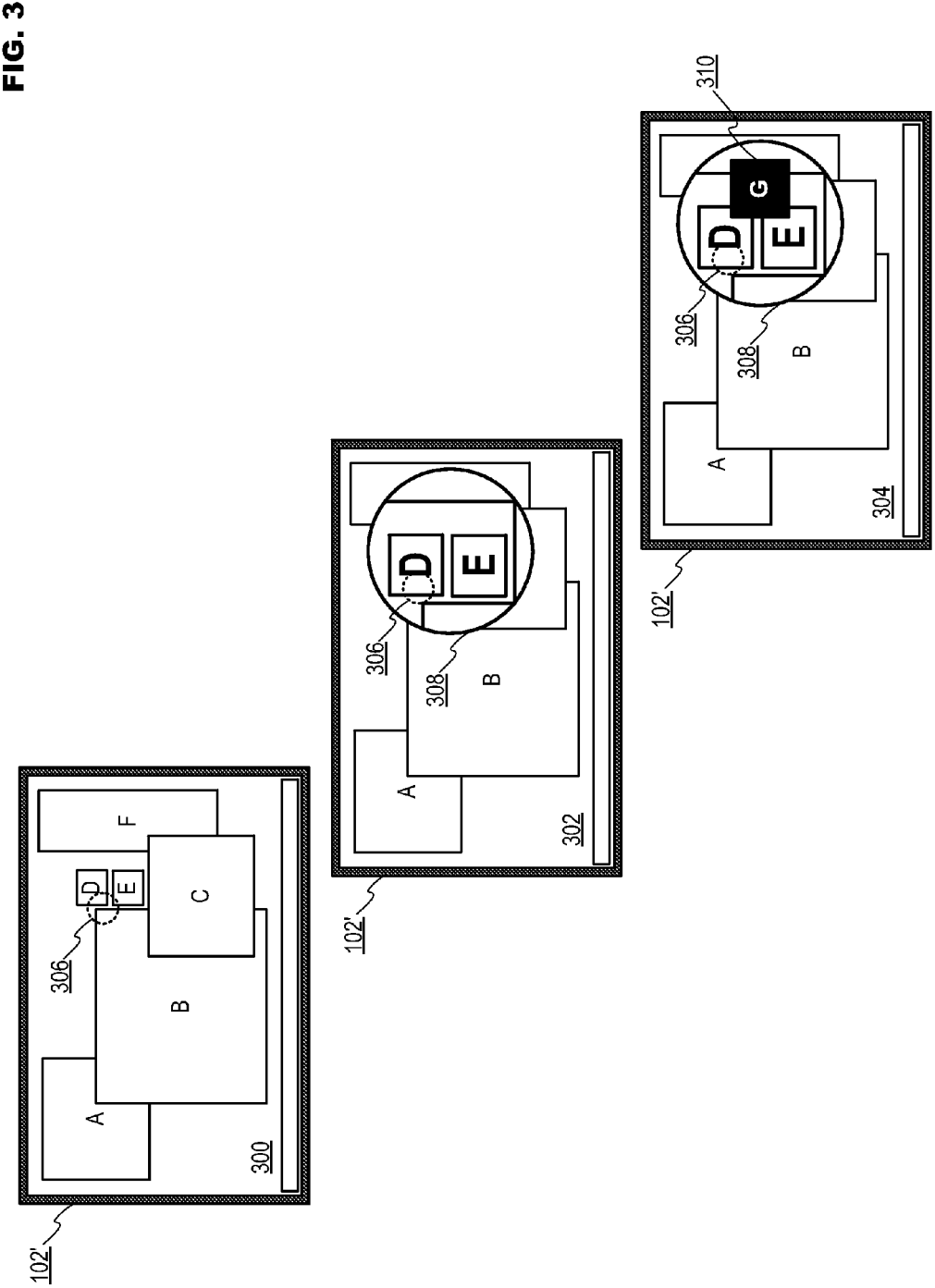
FIG. 3 illustrates example functionality for manipulating a user interface in accordance with at least one embodiment of the present disclosure.

FIG. 3 illustrates example functionality for manipulating a user interface in accordance with at least one embodiment of the present disclosure. While two example output operations are disclosed in FIG. 3, these examples have been presented simply for the sake of explanation herein, and are not intended to limit the output operations to only those disclosed in FIG. 3.

FIG. 3 discloses example images 300, 302 and 304 presented on display 102'. Image 300 may represent an initial state where no imminent user touch input 110 has been detected. Image 300 may comprise for example, visual elements that may be found in existing OS user interfaces such as application windows, icons, graphical objects like graphically-implemented controls, etc. Examples of these visual elements are identified in images 300 to 304 by letters A-F. Consistent with the present disclosure, imminent user touch input 110 may then be sensed at coordinates on the surface of display 102' indicated by 306. The sensing of imminent user touch input 110 may cause sensor 104 to send touch data to ITT module 106, the touch data including, for example, coordinate location 306. ITT module may evaluate the touch data in view of trigger conditions 112 and 114, and accordingly, may cause display 102' to perform various output operations.

Image 302 is an example of a situation in which first trigger condition 112 is satisfied. ITT module 106 may cause display 102' to present an enlarged portion of image 300, as shown at 308, overlaid upon the original image 300. The "zoomed in" area corresponding to the sensed imminent user touch input 110 may allow for a user to use touch control where such control was previously too difficult. In particular, an OS user interface designed for keyboard/mouse control may present objects that are too small for touch manipulation. Upon sensing that a user's finger is approaching a certain area of display 102', ITT module 106 may cause the image in the certain area to zoom to allow for touch control. The user's finger may still be "hovering" above display 102' when image 302 is presented, and thus, coordinates 306 may still be sensed within enlarged area 308. Enlarged area 308 makes the user's touch control more precise, and thus, more usable.

Image 304 is an example of a situation in which second trigger condition 114 is satisfied. As imminent user touch input 110 comes closer to the surface of display 102', it may then satisfy second trigger condition 114. For example, ITT module 106 may cause display 102' to present a user interface object such as, for example, a visual element G comprising a menu (e.g., hereafter "menu 310"). As part of the output operation, display 102 and/or ITT module 106 may initially determine an object on the display to which touch coordinates 306 corresponds (e.g., in the case of image 304 it corresponds to visual element D), and may then present menu 310 corresponding to the object. In at least one embodiment, ITT module 106 may interact with the object (e.g., or the software behind the object) to formulate menu 310. Alternatively, ITT module may employ existing OS-specific operations to display menu 310 (e.g., by simulating a "right-click" operation for a Windows OS, a "left-click hold" operation on a Mac OS, etc.). After menu 310 has been presented on display 102', it becomes the user's choice to select an option from menu 310 or to simply ignore the menu. Menu 310 may be ignored if, for example, the user simply desires to move the object associated with the menu (e.g., visual element D). In at least one embodiment, display 102' may then reset to image 300 after the user completes their desired touch interaction.

Figure 4:
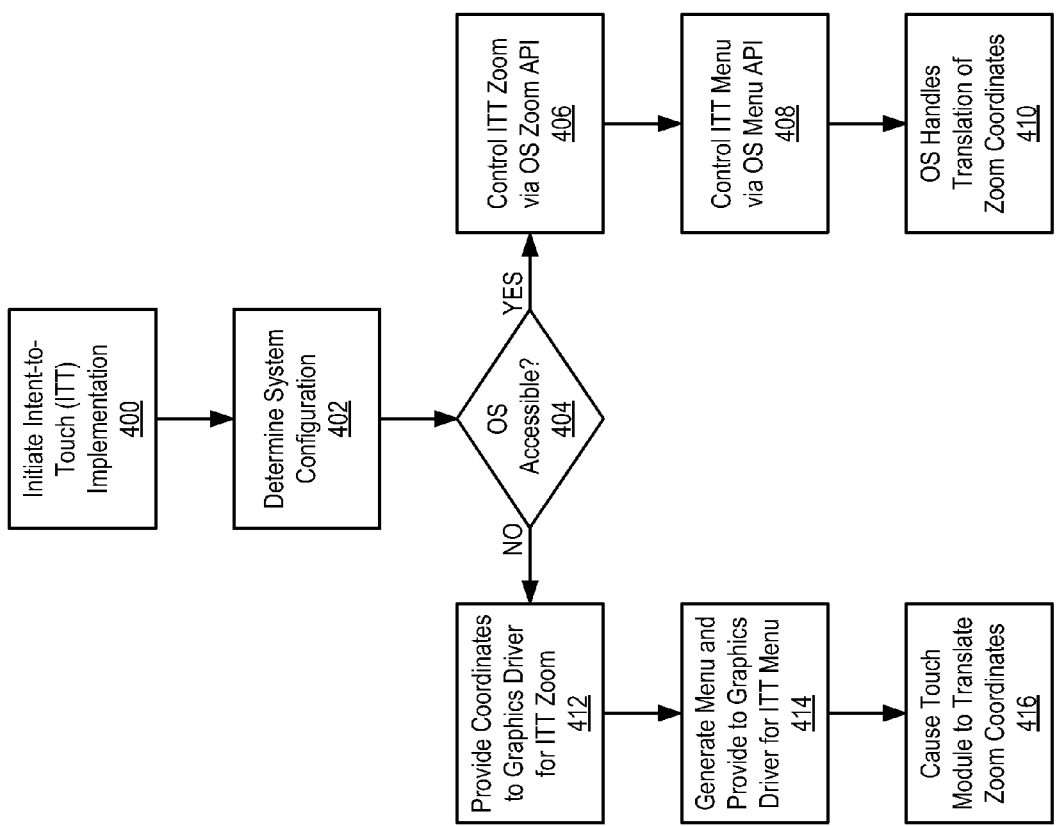
FIG. 4 illustrates example operations for implementing dynamic input mode selection in accordance with at least one embodiment of the present disclosure.

FIG. 4 illustrates example operations for implementing dynamic input mode selection in accordance with at least one embodiment of the present disclosure. ITT implementation may be initiated in operation 400. For example, ITT software may be installed in a system, equipment may be added to the system that triggers already loaded ITT software to initiate implementation, etc. In operation 402, a system configuration may be determined. The determination of system configuration may include, for example, determining available equipment, determining the OS controlling the system and the availability of OS features and interactivity, a determination of security configuration, user permissions, etc. A determination may then be made in operation 404 as to whether the OS is accessible for ITT implementation (e.g., the OS comprises at least one API usable for ITT).

If in operation 404 it is determined that the OS is accessible, then in operation 406 an ITT module (e.g., established as part of the ITT implementation) may utilize a zoom or magnification API in the OS to control image enlargement (e.g., zoom) based on an imminent user touch input. Likewise, in operation 408 an OS menu API may be utilized to present a menu corresponding to a particular object in the zoom area based on the imminent user touch input. When a user touch input is made within the zoom area, the OS may handle translating coordinates corresponding to the user touch input within the zoom area to coordinates corresponding to the same area in the original image presented on the display in operation 410. Alternatively, if in operation 404 it is determined that the OS is not accessible, then the ITT module may facilitate ITT functionality without OS assistance. For example, in operation 412 the ITT module may receive touch data (e.g., from a touch controller) comprising at least coordinates corresponding to an imminent user touch input, and may provide those coordinates directly to a graphics driver (e.g., via a graphics driver API) to cause the display to zoom into an area. If a menu is to be displayed corresponding to an object in the zoom area, ITT module 414 may generate a menu and/or menu data, and may proceed to provide the menu/menu data to the graphics driver in operation 414. The graphics driver may then proceed to generate and/or display the menu. In operation 416, the ITT module may then cause the touch controller to change modes to translate coordinates corresponding to any user touch inputs made within the zoom area to coordinates corresponding to the same area within the original image present on the display.

Figure 5:
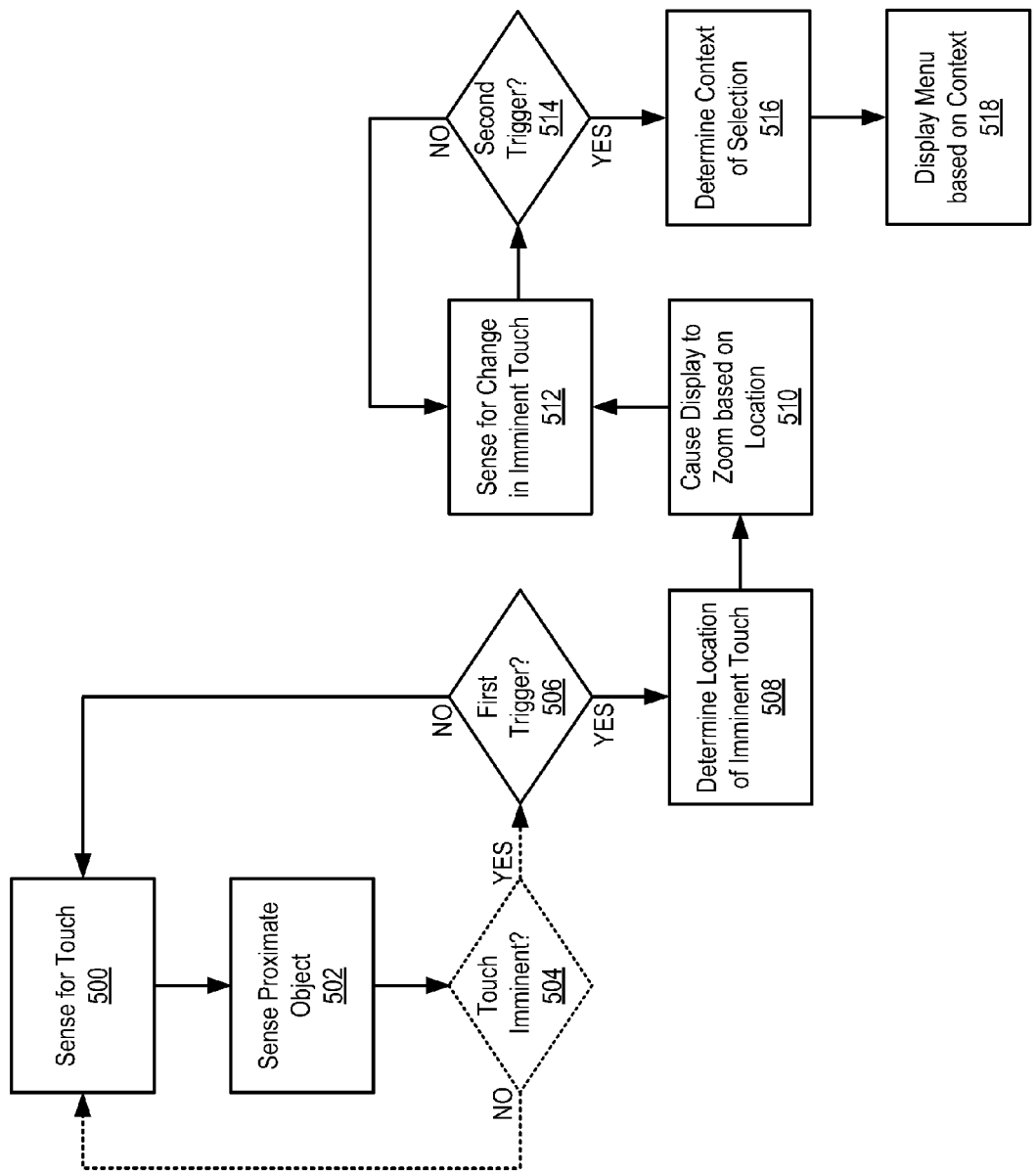
FIG. 5 illustrates example operations for dynamic input mode selection in accordance with at least one embodiment of the present disclosure.

FIG. 5 illustrates example operations for dynamic input mode selection in accordance with at least one embodiment of the present disclosure. In operation 500 a sensor may start sensing for an imminent user touch input to a display. An object proximate to the surface of the display may be sensed in operation 502. Operation 504 may be optional in that all systems may not incorporate this functionality, which may depend upon the capabilities of a particular system, the use for which the system is intended, etc. A determination may then be made in operation 504 as to whether the sensed object is an imminent user touch input or another object proximate to the surface of the display. If in operation 504 it is determined that a user touch input is not imminent, then sensing for an imminent user touch input may continue back in operation 500.

However, if in operation 504 it is determined that a user touch input is imminent, then in operation 506 a further determination may be made as to whether the first trigger condition has been satisfied. If in operation 506 it is determined that the first trigger condition has not been satisfied, then sensing for an imminent user touch input may continue back in operation 500. If in operation 506 it is determined that the first trigger condition was satisfied, then in operation 508 a location corresponding to the imminent user touch input may be determined. For example, the sensor may provide touch data to an ITT module, the touch data including coordinate data for the location of the imminent user touch input. In operation 510, the display may be caused to zoom (e.g., enlarge) at least a portion of the displayed image based on the location (e.g., by the ITT module). Sensing may then continue in operation 512 to determine if any changes are sensed regarding the imminent user touch input (e.g., changes in location, distance, etc.).

Sensing may continue in operation 512 until a determination is made in operation 514 that a second trigger condition has been satisfied. A context of selection may then be determined in operation 516. For example, the context of selection may include an object determined to be selected by the user based on the location of the imminent user touch input. The display may then be caused to display a menu corresponding to the context of the selection in operation 518 (e.g., by the ITT module).

While FIGS. 4 and 5 illustrate operations according to different embodiments, it is to be understood that not all of the operations depicted in FIGS. 4 and 5 are necessary for other embodiments. Indeed, it is fully contemplated herein that in other embodiments of the present disclosure, the operations depicted in FIGS. 4 and 5, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

Thus, the present application is directed to dynamic input mode selection. In general, a system may sense a user's finger approaching a surface of a display (e.g., an imminent user touch input) and, depending on at least one trigger condition, may perform at least one output operation. For example, a first trigger condition may cause a display to enlarge at least a portion of a displayed image based on the imminent user touch input, a second trigger condition may cause the display to present a menu corresponding to an object in the enlarged portion, etc. This functionality may be implemented utilizing either an operating system (OS)-aware configuration or an OS-unaware configuration. In an OS-aware configuration, an intent-to-touch (ITT) module may utilize application program interfaces (APIs) in the OS to facilitate display zooming, menu presentation, coordinate translation, etc. In an OS-unaware configuration, the ITT module may facilitate these actions without OS assistance.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a system for dynamic input mode selection, as provided below.

According to example 1 there is provided a system configured for dynamic input mode selection. The system may comprise a display to present at least one image, at least one sensor to sense an imminent user touch input to the display and an intent-to-touch module to determine a system configuration and implement intent-to-touch interaction in the system based at least on the system configuration, the intent-to-touch interaction including the system being configured to generate touch data when the at least one sensor senses an imminent user touch input and to cause the display to perform at least one output operation when the imminent user touch input satisfies at least one trigger condition.

Example 2 may include the elements of example 1, wherein the intent-to-touch module being to determine a system configuration comprises the intent-to-touch module being to determine characteristics of an operating system in the system.

Example 3 may include the elements of example 2, wherein the intent-to-touch module being to determine characteristics of the operating system comprises the intent-to-touch module being to determine if at least one application program interface in the operating system will allow the intent-to-touch module to interact with at least the display.

Example 4 may include the elements of example 3, wherein the system being to cause the display to perform at least one output operation comprises the intent-to-touch module being to interact with an application program interface for magnification in the operating system that then causes the display to further present an enlarged version of at least a portion of the image based on coordinates in the touch data when the first trigger condition is determined to have been satisfied.

Example 5 may include the elements of example 4, wherein the system being to cause the display to perform at least one output operation comprises the intent-to-touch module being to interact with an application program interface for menu generation to cause the display to further present at least a menu associated with at least one object in the enlarged version of the at least a portion of the image when the second trigger condition is determined to have been satisfied.

Example 6 may include the elements of any of examples 4 to 5, wherein the operating system is further to translate a user touch input executed within the enlarged version of at least a portion of the image into a user touch input executed within the image.

Example 7 may include the elements of any of examples 3 to 6, wherein the system being to cause the display to perform at least one output operation comprises the intent-to-touch module being to transmit coordinates in the touch data to a graphics driver that then causes the display to further present an enlarged version of at least a portion of the image based on the coordinates when the first trigger condition is determined to have been satisfied.

Example 8 may include the elements of example 7, wherein the system being to cause the display to perform at least one output operation comprises the intent-to-touch module being to generate a menu associated with at least one object in the enlarged version of the at least a portion of the image and to provide the menu to the graphics driver that then causes the display to further present at least the menu when the second trigger condition is determined to have been satisfied.

Example 9 may include the elements of any of examples 7 to 8, wherein the intent-to-touch module is to cause a touch controller for controlling the at least one sensor to translate coordinates associated with a user touch input in the enlarged version of the at least a portion of the image to coordinates for the user touch input in the image and to receive the coordinates for the user touch input in the image from the touch controller.

Example 10 may include the elements of any of examples 1 to 9, wherein the intent-to-touch module being to determine a system configuration comprises the intent-to-touch module being to determine characteristics of an operating system in the system including if at least one application program interface in the operating system will allow the intent-to-touch module to interact with at least the display.

Example 11 may include the elements of example 10, wherein the system being to cause the display to perform at least one output operation comprises the intent-to-touch module being to at least one of interact with an application program interface for magnification in the operating system that then causes the display to further present an enlarged version of at least a portion of the image based on coordinates in the touch data when the first trigger condition is determined to have been satisfied or interact with an application program interface for menu generation to cause the display to further present at least a menu associated with at least one object in the enlarged version of the at least a portion of the image when the second trigger condition is determined to have been satisfied.

Example 12 may include the elements of any of examples 1 to 11, wherein the at least one sensor is integrated within the display.

Example 13 may include the elements of any of examples 1 to 12, wherein the at least one trigger condition comprises a first trigger condition when a finger of a user is sensed at a first distance from the surface of the display and a second trigger condition when the finger of the user is sensed at a second distance from the surface of the display, the first distance being greater than the second distance.

Example 14 may include the elements of example 13, wherein the intent-to-touch module is further to determine if at least one of the first trigger condition has been satisfied or the second trigger condition has been satisfied based on the touch data.

Example 15 may include the elements of example 14, wherein the intent-to-touch module is further to determine how long at least one of the first trigger condition exists or the second trigger condition exists based on the touch data.

According to example 16 there is provided a method for dynamic input mode selection. The method may comprise determining a system configuration and implementing intent-to-touch interaction in the system based at least on the system configuration, the intent-to-touch interaction including generating touch data when at least one sensor in the system senses an imminent user touch input to a display in the system and causing the display to perform at least one output operation when the imminent user touch input satisfies at least one trigger condition.

Example 17 may include the elements of example 16, wherein the determining a system configuration comprises determining characteristics of an operating system in the system.

Example 18 may include the elements of example 17, wherein determining characteristics of the operating system comprises determining if at least one application program interface in the operating system will allow the intent-to-touch module to interact with at least the display.

Example 19 may include the elements of example 18, wherein causing the display to perform at least one output operation comprises interacting with an application program interface for magnification in the operating system that then causes the display to further present an enlarged version of at least a portion of the image based on coordinates in the touch data when the first trigger condition is determined to have been satisfied.

Example 20 may include the elements of example 19, wherein causing the display to perform at least one output operation comprises interacting with an application program interface for menu generation to cause the display to further present at least a menu associated with at least one object in the enlarged version of the at least a portion of the image when the second trigger condition is determined to have been satisfied.

Example 21 may include the elements of any of examples 19 to 20, and may further comprise translating, in the operating system, a user touch input executed within the enlarged version of at least a portion of the image into a user touch input executed within the image.

Example 22 may include the elements of any of examples 18 to 21, wherein causing the display to perform at least one output operation comprises transmitting coordinates in the touch data to a graphics driver that causes the display to further present an enlarged version of at least a portion of the image based on the coordinates when the first trigger condition is determined to have been satisfied.

Example 23 may include the elements of example 22, wherein causing the display to perform at least one output operation comprises generating a menu associated with at least one object in the enlarged version of the at least a portion of the image and providing the menu to the graphics driver that then causes the display to further present at least the menu when the second trigger condition is determined to have been satisfied.

Example 24 may include the elements of any of examples 22 to 23, and may further comprise causing a touch controller for controlling the at least one sensor to translate coordinates associated with a user touch input in the enlarged version of the at least a portion of the image to coordinates for the user touch input in the image and receiving the coordinates for the user touch input in the image from the touch controller.

Example 25 may include the elements of any of examples 16 to 24, wherein the determining a system configuration comprises determining characteristics of an operating system in the system including if at least one application program interface in the operating system will allow the intent-to-touch module to interact with at least the display.

Example 26 may include the elements of example 25, wherein causing the display to perform at least one output operation comprises at least one of interacting with an application program interface for magnification in the operating system that then causes the display to further present an enlarged version of at least a portion of the image based on coordinates in the touch data when the first trigger condition is determined to have been satisfied, or interacting with an application program interface for menu generation to cause the display to further present at least a menu associated with at least one object in the enlarged version of the at least a portion of the image when the second trigger condition is determined to have been satisfied.

Example 27 may include the elements of any of examples 16 to 26, wherein the at least one trigger condition comprises a first trigger condition when a finger of a user is sensed at a first distance from the surface of the display and a second trigger condition when the finger of the user is sensed at a second distance from the surface of the display, the first distance being greater than the second distance.

Example 28 may include the elements of example 27, and may further comprise determining if at least one of the first trigger condition has been satisfied or the second trigger condition has been satisfied based on the touch data.

Example 29 may include the elements of any of examples 27 to 28, and may further comprise determining how long at least one of the first trigger condition exists or the second trigger condition exists based on the touch data.

According to example 30 there is provided a system including at least a device, the system being arranged to perform the method of any of the above examples 16 to 29.

According to example 31 there is provided a chipset arranged to perform the method of any of the above examples 16 to 29.

According to example 32 there is provided at least one machine readable medium comprising a plurality of instructions that, in response to being executed on a computing device, cause the computing device to carry out the method according to any of the above examples 16 to 29.

According to example 33 there is provided a device configured for dynamic input mode selection, the device being arranged to perform the method of any of the above examples 16 to 29.

According to example 34 there is provided a system for dynamic input mode selection.

The system may comprise means for determining a system configuration and means for implementing intent-to-touch interaction in the system based at least on the system configuration, the intent-to-touch interaction including means for generating touch data when at least one sensor in the system senses an imminent user touch input to a display in the system and means for causing the display to perform at least one output operation when the imminent user touch input satisfies at least one trigger condition.

Example 35 may include the elements of example 34, wherein the means for determining a system configuration comprise means for determining characteristics of an operating system in the system.

Example 36 may include the elements of example 35, wherein the means for determining characteristics of the operating system comprise means for determining if at least one application program interface in the operating system will allow the intent-to-touch module to interact with at least the display.

Example 37 may include the elements of example 36, wherein the means for causing the display to perform at least one output operation comprise means for interacting with an application program interface for magnification in the operating system that then causes the display to further present an enlarged version of at least a portion of the image based on coordinates in the touch data when the first trigger condition is determined to have been satisfied.

Example 38 may include the elements of example 37, wherein the means for causing the display to perform at least one output operation comprise means for interacting with an application program interface for menu generation to cause the display to further present at least a menu associated with at least one object in the enlarged version of the at least a portion of the image when the second trigger condition is determined to have been satisfied.

Example 39 may include the elements of any of examples 37 to 38, further comprising means for translating, in the operating system, a user touch input executed within the enlarged version of at least a portion of the image into a user touch input executed within the image.

Example 40 may include the elements of any of examples 36 to 39, wherein the means for causing the display to perform at least one output operation comprise means for transmitting coordinates in the touch data to a graphics driver that causes the display to further present an enlarged version of at least a portion of the image based on the coordinates when the first trigger condition is determined to have been satisfied.

Example 41 may include the elements of example 40, wherein the means for causing the display to perform at least one output operation comprise means for generating a menu associated with at least one object in the enlarged version of the at least a portion of the image; and means for providing the menu to the graphics driver that then causes the display to further present at least the menu when the second trigger condition is determined to have been satisfied.

Example 42 may include the elements of any of examples 40 to 41, and may further comprise means for causing a touch controller for controlling the at least one sensor to translate coordinates associated with a user touch input in the enlarged version of the at least a portion of the image to coordinates for the user touch input in the image and means for receiving the coordinates for the user touch input in the image from the touch controller.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A system configured for dynamic input mode selection, comprising:
   a display to present at least one image;
   at least one sensor to generate touch data based on an imminent user touch input to the display; and
   intent-to-touch circuitry to:
   determine a system configuration for the system, the system configuration at least identifying an operating system of the system;
   determine whether the identified operating system includes at least one application program interface (API) that is usable by the intent-to-touch circuitry;
   determine whether the imminent user touch input satisfies a first trigger condition;
   when it is determined that the first trigger condition is satisfied and when the operating system includes the at least one API, implement an intent-to-touch interaction using the at least one API, wherein the intent to touch interaction causes the display to perform at least one output operation; and
   when it is determined that the first trigger condition is satisfied and when the operating system does not include the at least one API, implement the intent-to-touch interaction using a graphics driver, wherein the intent-to-touch interaction causes the display to perform the at least one output operation.

2. The system of claim 1, wherein the at least one API that is usable by the intent-to-touch circuitry is a magnification API that causes the display to present an enlarged version of at least a portion of the image based on coordinates in the touch data when the first trigger condition is determined to have been satisfied.

3. The system of claim 2, further comprising an additional API that is usable by the intent-to-touch circuitry, wherein the additional API is a menu generation API that causes the display to present at least a menu associated with at least one object in the enlarged version of the at least a portion of the image when a second trigger condition is determined to have been satisfied.

4. The system of claim 2, wherein the operating system translates a user touch input executed within the enlarged version of at least a portion of the image into a user touch input executed within the image.

5. The system of claim 1, wherein when it is determined that the first trigger condition is satisfied and when the operating system does not include the at least one API, the intent-to-touch circuitry transmits coordinates in the touch data to the graphics driver, the graphics driver causes the display to further present an enlarged version of at least a portion of the image based on the coordinates.

6. The system of claim 5, wherein, when it is determined that the first trigger condition is satisfied and when the operating system does not include the at least one API, the intent-to-touch circuitry generates a menu associated with at least one object in the enlarged version of the at least a portion of the image and to provide the menu to the graphics driver that then causes the display to further present at least the menu when a second trigger condition is determined to have been satisfied.

7. The system of claim 5, wherein the intent-to-touch circuitry is to cause a touch controller for controlling the at least one sensor to translate coordinates associated with a user touch input in the enlarged version of the at least a portion of the image to coordinates for the user touch input in the image and to receive the coordinates for the user touch input in the image from the touch controller.

8. A method for dynamic input mode selection, comprising:
  determining, via intent-to-touch circuitry, a system configuration for a system, the system configuration at least identifying an operating system of the system;
  determining whether the identified operating system includes at least one application program interface (API) that is usable by the intent-to-touch circuitry;
  determining whether the imminent user touch input satisfies a first trigger condition;
  when it is determined that the first trigger condition is satisfied and when the operating system includes the at least one API, implementing an intent-to-touch interaction using the at least one API; and
  when it is determined that the first trigger condition is satisfied and when the operating system does not include the at least one API, implementing the intent-to-touch interaction using a graphics driver, wherein the intent-to-touch interaction includes:
    generating, via the intent-to-touch circuitry, touch data when at least one sensor in the system senses an imminent user touch input to a display in the system; and
    causing, via the intent-to-touch circuitry, the display to perform at least one output operation when the imminent user touch input satisfies at least one trigger condition.

9. The method of claim 8, wherein the at least one API that is usable by the intent-to-touch circuitry is a magnification API that causes the display to present an enlarged version of at least a portion of the image based on coordinates in the touch data when the first trigger condition is determined to have been satisfied.

10. The method of claim 9, wherein the determining of whether the identified operating system includes at least one API that is usable by the intent-to-touch circuitry further includes determining whether there is an additional API that is usable by the intent-to-touch circuitry, wherein the additional API is a menu generation API to cause the display to present at least a menu associated with at least one object in the enlarged version of the at least a portion of the image when a second trigger condition is determined to have been satisfied.

11. The method of claim 9, further comprising:
  translating, in the operating system, a user touch input executed within the enlarged version of at least a portion of the image into a user touch input executed within the image.

12. The method of claim 8, further comprising, when it is determined that the first trigger condition is satisfied and when the operating system does not include the at least one API, transmitting coordinates in the touch data to a graphics driver that causes the display to present an enlarged version of at least a portion of the image based on the coordinates.

13. The method of claim 12, further comprising:
  causing a touch controller to control the at least one sensor to translate coordinates associated with a user touch input in the enlarged version of the at least a portion of the image to coordinates for the user touch input in the image; and
  receiving the coordinates for the user touch input in the image from the touch controller.

14. One or more non-transitory machine-readable memories having stored thereon, individually or in combination, instructions for dynamic input mode selection that, when executed by one or more processors, cause the one or more processors to:
  determine, via intent-to-touch circuitry, a system configuration for a system, the system configuration at least identifying an operating system of the system;
  determine whether the identified operating system includes at least one application program interface (API) that is usable by the intent-to-touch circuitry;
  determine whether the imminent user touch input satisfies a first trigger condition;
  when it is determined that the first trigger condition is satisfied and when the operating system includes the at least one API, implement an intent-to-touch interaction using the at least one API; and
  when it is determined that the first trigger condition is satisfied and when the operating system does not include the at least one API, implement the intent-to-touch interaction using a graphics driver, wherein the intent-to-touch interaction includes:
    generating, via intent-to-touch circuitry, touch data when at least one sensor in the system senses an imminent user touch input to a display in the system; and
    causing, via the intent-to-touch circuitry, the display to perform at least one output operation when the imminent user touch input satisfies at least one trigger condition.

15. The one or more non-transitory machine-readable memories of claim 14, wherein the at least one API that is usable by the intent-to-touch circuitry is a magnification API that causes the display to present an enlarged version of at least a portion of the image based on coordinates in the touch data when the first trigger condition is determined to have been satisfied.

16. The one or more non-transitory machine-readable memories of claim 15, wherein the determination of whether the identified operating system includes the at least one API that is usable by the intent-to-touch circuitry further includes determining whether there is an additional API that is usable by the intent-to-touch circuitry, wherein the additional API is a menu generation API to cause the display to further present at least a menu associated with at least one object in the enlarged version of the at least a portion of the image when a second trigger condition is determined to have been satisfied.

17. The one or more non-transitory machine-readable memories of claim 15, further comprising instructions for causing the one or more processors to:

translate, in the operating system, a user touch input executed within the enlarged version of at least a portion of the image into a user touch input executed within the image.

18. The one or more non-transitory machine-readable memories of claim 14, further comprising, when it is determined that the first trigger condition is satisfied and when the operating system does not include the at least one API, transmit coordinates in the touch data to a graphics driver that causes the display to further present an enlarged version of at least a portion of the image based on the coordinates.

19. The one or more non-transitory machine-readable memories of claim 18, further comprising instructions for causing the one or more processors to:

cause a touch controller to control the at least one sensor to translate coordinates associated with a user touch input in the enlarged version of the at least a portion of the image to coordinates for the user touch input in the image; and receive the coordinates for the user touch input in the image from the touch controller.

\* \* \* \* \*